(12) United States Patent
Nozaki et al.

(10) Patent No.: US 6,495,210 B2
(45) Date of Patent: Dec. 17, 2002

(54) FLAME RETARDANT FOR MESH SHEETS AND FLAMEPROOF MESH SHEET

(75) Inventors: Saiji Nozaki, Toyama-Ken (JP); Kuniaki Kamiya, Osaka-fu (JP)

(73) Assignee: Kyowa Kabushikikaisha, Osaka (JP)

( * ) Notice: Subject to any disclaimer, the term of this patent is extended or adjusted under 35 U.S.C. 154(b) by 0 days.

(21) Appl. No.: 09/860,446

(22) Filed: May 21, 2001

(65) Prior Publication Data

US 2001/0031316 A1 Oct. 18, 2001

Related U.S. Application Data

(62) Division of application No. 09/118,006, filed on Jul. 17, 1998, now Pat. No. 6,248,160.

(30) Foreign Application Priority Data

Jul. 18, 1997 (JP) .............................. 9-225464

(51) Int. Cl.⁷ ................................ B05D 1/00
(52) U.S. Cl. ................................ 427/393.3; 427/430.1
(58) Field of Search ........................ 427/393.3, 430.1

(56) References Cited

U.S. PATENT DOCUMENTS

| | | | |
|---|---|---|---|
| 4,442,255 A | * 4/1984 | Marciandi et al. | .......... 524/414 |
| 4,877,823 A | 10/1989 | Plachetta et al. | |
| 5,314,530 A | 5/1994 | Wierer et al. | |
| 5,532,302 A | 7/1996 | Nakanishi et al. | |
| 5,830,319 A | 11/1998 | Landin | |
| 6,248,820 B1 | * 6/2001 | Nozaki et al. | ............... 524/414 |
| 6,312,810 B1 | * 11/2001 | Nozaki et al. | ............ 428/411.1 |

FOREIGN PATENT DOCUMENTS

| | | |
|---|---|---|
| EP | 505 940 | 9/1992 |
| EP | 546 841 | 6/1993 |
| EP | 848032 | 6/1998 |
| JP | 46-024154 | 7/1971 |
| JP | 52-41786 | 10/1977 |
| JP | 53-18065 | 6/1978 |
| JP | 61-9430 | 3/1986 |
| JP | 61-223045 | 10/1986 |
| JP | 62-012005 | 1/1987 |
| JP | 09-048870 | * 2/1997 |
| WO | 95/16736 | 6/1995 |

OTHER PUBLICATIONS

Seki, Patent Abstract of Japan, (1986), 1009682.
Kanayama et al., "Recent Trend On Red Phosphoroas Group Flame Retardant", Japan Plastics, vol. 42(2): 74–80, (1991).
Nishizawa, Porima Daijesuto (1994), 46(2), pp 68–79.
Horold, Polym. Degrad. Stab. (1999), 64(3), pp 427–731.
Hoerold et al, Recent Adv. Flame Retard. Polym. Mater. (1999), 10, pp 278–302.

* cited by examiner

*Primary Examiner*—Erma Cameron
(74) *Attorney, Agent, or Firm*—Rader, Fishman & Grauer PLLC

(57) ABSTRACT

A method for preparing flame retardant mesh sheets and multi-filament fibers which do not do not generate halogen gas at the time of combustion. Also, a method for preparing mesh sheet and multi-filament fibers coated with a flame retardant including 1.5 to 15 wt % of red phosphorus and 10 to 70 parts by weight of an ammonium polyphosphate compound based on 100 parts by weight of the solid content of an aqueous solution of a polyolefin resin having a resin solid content of 20 to 45 wt%.

24 Claims, No Drawings

FLAME RETARDANT FOR MESH SHEETS AND FLAMEPROOF MESH SHEET

This application is a divisional of U.S. application Ser. No. 09/118,006 filed Jul. 17, 1998, now U.S. Pat. No. 6,248,160.

BACKGROUND OF THE INVENTION

1. Field of the Invention

The present invention relates to a halogen-free flameproof mesh sheet used outdoors such as a construction site for a long time.

2. Prior Art

In recent years, there has been a trend toward the construction of buildings having a large number of stories in the construction industry. Meanwhile, there has been an increase in the number of houses having a small number of stories. Flameproof mesh sheets for safety and protection and scattering prevention flameproof mesh sheets must be laid in these buildings and regulations are becoming more and more strict.

Currently, used flameproof mesh sheets and scattering prevention flameproof mesh sheets are produced by weaving yarn prepared by coating a polyester, nylon or polypropylene multi-filament fiber with a vinyl chloride-based paste resin composition and heating and then heating the obtained cloth and by coating a fabric prepared by weaving and processing a multi-filament fiber with a vinyl chloride-based paste resin composition, heating and processing to a desired shape, respectively.

A vinyl chloride containing chlorine is used as the resin composition for coating a fiber and fabric. Illustrative examples of the flame retardant include chloride-based flame retardants such as chlorinated paraffin, bromine-based flame retardants such as decabromodiphenyl oxide, and inorganic flame retardants such as antimony trioxide (Examined Japanese Patent Publication Nos. 52-41786, 53-18065 and 61-94305, Plastics, February, 1991).

In recent years, it has been globally demanded to avoid the use of resins and flame retardants containing elemental halogen which generates harmful gas at the time of combustion from the viewpoint of the environmental preservation of the earth.

Japanese Laid-open Patent Application No. 61-223045 proposes that red phosphorus and ammonium polyphosphate are kneaded into polyolefin to prevent corrosion by halogen contained in a halogen-containing compound flame retardant. However, there is unknown a flame retardant which is dispersed in an aqueous dispersion of a polyolefin resin.

SUMMARY OF THE INVENTION

In view of the above situation, it is an object of the present invention to provide a flame retardant for halogen-free flameproof mesh sheets which does not generate harmful halogen gas at the time of combustion and a flameproof mesh sheet comprising the same.

The present invention relates to:

A flame retardant for mesh sheets comprising about 1.5 to 15 parts by weight of red phosphorus and about 10 to 70 parts by weight of an ammonium polyphosphate compound based on 100 parts by weight of a solid content of an aqueous dispersion of a polyolefin resin having a resin solid content of about 20 to 45 wt %.

The polyolefin resin of the aqueous dispersion of a polyolefin resin may be selected from ethylene-methacrylic acid metal ion crosslinked copolymers and ethylene-based β-olefin copolymers.

The polyolefin resin of the aqueous dispersion of a polyolefin resin may be a mixture of about 90 to 10 wt % of an ethylene-methacrylic acid metal ion crosslinked copolymer and about 10 to 90 wt % of an ethylene-based α-olefin copolymer.

The red phosphorus and ammonium polyphosphate can be micro-encapsulated.

The flame retardant can further comprises about 60 to 150 parts by weight of a metal hydroxide based on 100 parts by weight of the solid content of the aqueous dispersion of a polyolefin resin. The metal hydroxide can be magnesium hydroxide and/or aluminum hydroxide.

The flameproof mesh sheet can be prepared by impregnating with the flame retardant, heating, and woven.

The flameproof mesh sheet can have an equivalent single fineness of a multi-filament fiber of about 3 to 17 denier, a total, fineness of about 1,000 to 4,500 denier, a tensile strength of about 6 to 10 g/denier and a break strength of about 14 to 45 %.

The flameproof mesh sheet can be coated by impregnating a mesh sheet fabric woven of a multi-filament fiber with the flame retardant for mesh sheets and heated.

The flameproof mesh sheet can be prepared by paralleling 1 to 4 synthetic fibers having an equivalent single fineness of about 2 to 13 denier, a total fineness of about 150 to 2,500 denier, a tensile strength of about 6 to 10 g/denier and a break strength of about 14 to 45 % and leno weaving with a weaving machine and has a mesh length of about 10 to 140 warps/10 cm and about 10 to 140 wefts/10 cm.

The flameproof mesh sheet may be used in an amount of about 60 to 350 parts by weight based on 100 parts by weight of the multi-filament fiber or the mesh sheet fabric woven of the multi-filament fiber to coat the mesh sheet fabric by impregnation.

DETAILED DESCRIPTION OF THE PREFERRED EMBODIMENT

An aqueous dispersion of a polyolefin resin is used as a base material in the present invention because a multi-filament fiber and fabric are fully impregnated with a flame retardant and uniformly coated with the flame retardant.

Preferable, the aqueous dispersion of a polyolefin resin comprises as the polyolefin resin an ethylene-methacrylic acid metal ion crosslinked copolymer containing about 10 to 20 wt % of methacrylic acid and can have a solid content of about 20 to 45 wt %, a particle diameter of about 0.01 to 3 $\mu$m, a pH of 8 to 11, a viscosity of about 30 to 1,000 cp (a BM type viscometer, 6 rotations). The polyolefin resin is particularly preferably an ethylene-methacrylic acid metal ion crosslinked copolymer and can have a resin surface hardness of about D-40 to 75 (Shore-D: ASTMD2240) such as an ionomer resin exemplified by S-300, S-650 or S-100 (of Mitsui Petrochemical Industry Co.).

An ethylene-based α-olefin copolymer may be used and a dispersion thereof has a solid content of about 20 to 45 wt %, a particle diameter of about 1 to 10 $\mu$m, a pH of about 8 to 11, a viscosity of about 2,000 to 8,000 cp (a BM type viscometer, 6 rotations) and a resin surface hardness of about A-80 to 97 (Shore A: ASTMD). The ethylene-based α-olefin copolymer is preferably a thermoplastic elastomer resin comprising about 50 wt % or more of ethylene, such as A-100 or A-200 (of Mitsui Petrochemical Industry Co.).

When a mixture of about 90 to 10 wt % of an ethylene-methacrylic acid metal ion crosslinked copolymer and about 10 to 90 wt % of an ethylene-based α-olefin copolymer is used, the surface hardness of the ethylene-methacrylic acid metal ion crosslinked copolymer having a higher surface hardness and the surface hardness of the ethylene-based α-olefin copolymer having a lower surface hardness are well balanced and the feeling of a conventional flameproof mesh sheet produced from a soft vinyl chloride resin is obtained. As for the preferable ratio of the two materials, the ethylene-methacrylic acid metal ion crosslinked copolymer may be used in a proportion of about 80 to 40 wt % and the ethylene-based α-olefin in copolymer in a proportion of about 20 to 60 wt %.

Red phosphorus used in the present invention may be preferably micro-encapsulated. Use of the micro-encapsulated red phosphorus makes it possible to reduce an increase in the viscosity of an aqueous dispersion when red phosphorus is mixed into the olefin aqueous dispersion. Further, the flameproof mesh sheet is detached and washed to remove dirt after it is spread at a construction site and used for 4 to 8 months. It is washed by immersing it in hot water heated at about 40° C. and containing a detergent for several hours. At this point, red phosphorus can be prevented from dissolving in water by micro-encapsulation. The concentration of red phosphorus is about 75 to 95 % and the average particle diameter thereof is about 10 to 40 μm.

Micro-encapsulation can be suitably carried out by coating the surface of a red phosphorus particle with a resin or inorganic material by interfacial polymerization, coacervation or the like.

The ammonium polyphosphate compound used in the present invention may be ammonium polyphosphate or amide polyphosphate. Use of the micro-encapsulated ammonium polyphosphate compound makes it possible to reduce an increase in the viscosity of the aqueous dispersion when the ammonium polyphosphate compound is mixed into the aqueous dispersion of an olefin resin. Further, the flameproof mesh sheet is detached and washed to remove dirt after it is spread at a construction site and used for about 4 to 8 months. It is washed by immersing in hot water heated at about 40° C. and containing a detergent. At this point, the ammonium polyphosphate compound can be made hardly soluble in water and stable by micro-encapsulation. The concentration of phosphor contained in the ammonium polyphosphate compound is about 15 to 35 % and the average particle diameter of the compound is about 5 to 40 μm. Micro-encapsulation can be carried out like red phosphorus.

Red phosphorus and an ammonium polyphosphate compound may be used as flame retardants in the present invention because when a resin composition containing red phosphorus is brought close to flames, the resin and red phosphorus on the surface first burn and the resin is bonded to oxygen in the air to become carbon dioxide gas, water and carbon. In this case, red phosphorus promotes the carbonization of the ethylene-methacrylic acid metal ion crosslinked copolymer and the ethylene-α-olefin copolymer. Meanwhile, red phosphorus is bonded to oxygen to become an oxide which is further bonded to water to become condensation phosphoric acid. A film made from a mixture of carbon and condensation phosphoric acid formed on the surface of the resin becomes an oxygen impermeable layer on the surface of the resin, suppresses the combustion of the resin and makes the resin flame resistant.

Red phosphorus may exist in an amount of 1.5 to 15 parts by weight based on 100 parts by weight of the polyolefin resin solid content of the aqueous dispersion of a polyolefin resin having a solid content of 20 to 45 wt %. If the content of red phosphorus is less than 1.5 parts by weight based on the resin solid content, its flameproofing effect may not be provided and if the content is more than about 15 parts by weight, its flameproofing effect will not be improved, the resulting flameproof mesh sheet will have a strong red tint and difficult to be colored even with a pigment.

In this case, when an ammonium phosphate compound is present, the ammonium polyphosphate compound thermally decomposes at the time of combustion and generates nitrogen gas which shuts off oxygen. The ammonium polyphosphate compound promotes the carbonization of a polyolefin resin as a dehydrocarbonizing agent and improves a combustion effect while it generates nitrogen-containing gas. In the present invention, the ammonium polyphosphate compound must be existent in an amount of about 10 to 70 parts by weight based on 100 parts by weight of the polyolefin resin solid content of the aqueous dispersion of a polyolefin resin having a solid content of about 20 to 45 wt %. Below 10 parts by weight, a flameproofing effect may not be provided and above 70 parts by weight, a flameproofing effect may not be improved.

Nova Excel 140 or Nova Red 120 (Rin Kagaku Kogyo Co.) may be used as red phosphorus.

TERRAJU-60 or TERRJU-70 (of Chisso Corp.), or Hostafuram AP462 (Hoechst Co.) may be used as the ammonium polyphosphate compound.

When a metal hydroxide is further used, a great flameproof effect may be obtained advantageously. The metal hydroxide is preferably magnesium hydroxide and/or aluminum hydroxide which can be used in conjunction with red phosphorus and ammonium polyphosphate to obtain a greater effect. The metal hydroxide can be existent in an amount of about 60 to 150 parts by weight based on 100 parts by weight of the polyolefin resin solid content of a polyolefin resin aqueous dispersion.

When the amount of the metal hydroxide is less than 60 parts by weight, its effect of promoting flame resistance can be small and when the amount is more than about 150 parts by weight, the viscosity of the aqueous dispersion of a polyolefin resin can increase disadvantageously.

As the aluminum hydroxide may be used: Hijilite H-42M or Hijilite H-43M (Showa Denko K.K.).

As the magnesium hydroxide may be used: Kisuma 5 (Kyowa Kagaku Kogyo Co.).

The multi-filament used in the present invention is at least one multi-filament selected from polyesters, nylons, polypropylene and vinylon. It is preferably a polyester fiber from viewpoints of strength and thermal shrinkage.

A high-strength and lightweight flameproof mesh sheet can be obtained by controlling the tensile strength of the multi-filament fiber to about 6 to 10 g/denier. A flameproof mesh sheet having high toughness and high impact energy absorption at the time of falling can be obtained by controlling the break elongation of the multi-filament fiber to about 14 to 45 %.

The multi-filament which is treated with a flame retardant and then woven has an equivalent single fineness of about 3 to 17 denier, preferably about 3 to 12 denier, particularly preferably 4 to 9 denier and a total fineness of about 1,000 to 4,500 denier, preferably about 1,260 to 3,500 denier, particularly preferably about 1,500 to 3,000 denier.

The multi-filament used in a fabric which is woven and then treated with a flame retardant has an equivalent single fineness of about 2 to 13 denier, preferably about 2 to 11 denier, particularly preferably about 2.5 to 9 denier and a total fineness of about 150 to 2,500 denier, preferably about 200 to 2,000 denier, particularly preferably about 250 to 1,500 denier. By controlling tensile strength to 6 to 10 g/denier, a high-strength and lightweight flameproof mesh sheet can be obtained and by controlling break elongation to about 14 to 45 %, a flameproof mesh sheet having high toughness and high impact energy absorption at the time of falling can be obtained.

A flameproof mesh sheet which needs to have high strength and toughness is prepared by paralleling 1 or 2 to 4 filament fibers and leno weaving them with a Dobby weaving machine. A scattering prevention flameproof mesh sheet is prepared by leno weaving a fabric of a single filament fiber with a weaving machine in most cases. A flameproof mesh sheet prepared in this manner can have a mesh length of about 10 to 140 warps/10 cm and about 10 to 140 wefts/10 cm, preferably 20–120 to 140 warps/10 cm and about 20 to 120 wefts/10 cm.

As for the weight ratio of the multi-filament fiber and fabric to the solid content of a flame retardant, the solid content of the flame retardant is used in an amount of about 60 to 350 parts by weight based on 100 parts by weight of the multi-filament fiber and fabric. When the solid content of the flame retardant is less than about 60 parts by weight based on 100 parts by weight of the multi-filament fiber or fabric, coating becomes nonuniform and the multi-filament fiber and fabric are partly exposed, thereby deteriorating outer appearance and weatherability. Further, flame resistance also lowers. When the solid content is more than about 350 parts by weight, the weight of the flameproof mesh sheet may increase with the result of deteriorated handling properties disadvantageously.

A pigment, dye, ultraviolet absorber, optical stabilizer, antioxidant, stabilizer, diluent, thickening agent, foaming agent, mold preventing agent, alga preventing agent and the like can be used in conjunction with the flame retardant in the present invention by suitably selecting types and amounts thereof.

A description is subsequently given of a process for producing a flameproof mesh sheet of the present invention. When the flameproof mesh sheet of the present invention is produced using a multi-filament fiber, coated yarn prepared by coating the fiber with a flame retardant through a sizing nozzle, heating and gelling is taken up by a winder. This coated yarn taken up by the winder is woven into a fabric by a weaving machine. This fabric is introduced into a heating furnace and heated for non-shifting processing in order to obtain cloth.

This cloth is cut to a predetermined size, sewed and subjected to non-shift processing to obtain a halogen-free flameproof mesh sheet.

When the flameproof mesh sheet of the present invention is produced using a fabric, woven cloth may be obtained by weaving the multi-filament fiber by a Dobby weaving machine. After this woven cloth is immersed in a tank filled with a flame retardant for mesh sheets and let pass through the tank, it is dried with an air blow, introduced into a heating furnace and gelled by heating to obtain coated cloth. To increase the amount of the flame retardant coated on the fabric, the fabric is immersed in and let pass through the tank filled with the flame retardant at least two times to produce coated cloth. The cloth is cut to a predetermined size, sewed and subjected to non-shifting processing to produce a halogen-free flameproof mesh sheet.

EXAMPLE 1

100 parts by weight of the S-300 aqueous dispersion of an ethylene-methacrylic acid metal ion crosslinked copolymer (solid content of 35%) was injected into a planetary mixer (volume of 25 liters), and then 1.5 parts by weight of the Nova Excel red phosphorus (4.3 parts by weight based on 100 parts by weight of a resin solid content), 12 parts by weight of the TERRAJU-60 ammonium polyphosphate (34.3 parts by weight based on 100 parts by weight of the resin solid content), 0.3 part by weight of the Tinuabin 327 ultraviolet absorber (0.86 part by weight based on the resin solid content), and 0.3 part by weight of the Irganox 1010 antioxidant (0.86 part by weight based on the resin solid content) were added gradually in about 3 minutes. After addition, 10 parts by weight of isopropyl alcohol and 50 parts by weight of water were added gradually under agitation. After addition, these materials were stirred for another 20 minutes. Then, vacuum deforming was carried out at a reduced pressure of 5 mmmHg for 30 minutes to obtain a flame retardant having a viscosity of 2,140 cps (a BM type viscomreter, rotor V-6, 12 rpm, 25° C.). The flame retardant was charged into a bath, and a polyester multi-filament fiber having a total fineness of 1,750 denier, each consisting of 384 filaments, an equivalent single fineness of 4.5 denier, a tensile strength of 8.5 g/denier and a break elongation of 21% was caused to pass through a guide, pinched with a pinch roll, further pass through a guide roll, the bath of the flame retardant and then a sizing nozzle (diameter of 0.7 mm) to coat the multi-filament fiber. Thereafter, the obtained strand was heated in a heating to furnace at 140° C. and caused to pass through another sizing nozzle (diameter of 0.8 mm) to coat the multi-filament fiber. The strand was further heated in a heating furnace at 170° C. to produce coated yarn of 4,030 denier. The weight ratio of the flame retardant for mesh sheets to the multi-filament fiber was 130/100.

Thereafter, the coated yarn was woven into a mesh plain weave fabric with a rapier loom at a speed of 50 cm/min with 52 warps/10 cm and 52 wefts/10 cm. This fabric was then heated in a heating furnace at 160° C. to thermally fuse intersecting points between the warps and wefts to obtain the flameproof mesh sheet of the present invention. Further, this cloth was cut to a width of 190 cm and a length of 520 cm, sewed with a sewing machine and subjected to non-shifting processing to obtain a flameproof mesh sheet having a width of 180 cm and a length of 520 cm.

The measurement results of the properties of the flameproof mesh sheet are shown in Table 1.

EXAMPLE 2

A flame retardant having a viscosity of 3,300 cps was obtained in the same manner as in Example 1 except that the A-100 aqueous solution of an ethylene-based α-olefin copolymer (solid content of 40%) was used in place of the ethylene-methacrylic acid metal ion crosslinked copolymer, 18 parts by weight of Hostafuram AP462 (45 parts by weight based on 100 parts by weight of a resin solid content) was used as ammonium polyphosphate and 100 parts by weight of water was added.

A flameproof mesh sheet was obtained in the same manner as in Example except that the multi-filament fiber of 2,750 denier was used, a sizing nozzle having a diameter of 0.8 mm was used for the first time and that having a diameter of 0.9 mm was used for the second time to obtain coated yarn of 5,225 denier.

The measurement results of the properties of the flameproof mesh sheet are shown in Table1.

EXAMPLE 3

A flameproof mesh sheet was obtained in the same manner as in Example 1 except that 70 parts by weight of the S-300 ethylene-methacrylic acid metal ion crosslinked copolymer (solid content of 30 wt %) and 30 parts by weight of the A-100 ethylene-based α-olefin copolymer (solid content of 40 wt %) were used. The deasurement results of the properties of the flameproof mesh sheet are shown in Table 1.

EXAMPLE 4

A flameproof mesh sheet was obtained in the same manner as in Example 1 except that S-650 (solid content of 27 %) was used as the ethylene-methacrylic acid metal ion crosslinked copolymer and 3 parts by weight of Nova Red-120 (11.1 parts by weight based on 100 parts by weight of a resin solid content) was used as red phosphorus.

The measurement results of the properties of the flameproof mesh sheet are shown in Table 1.

EXAMPLE 5

A flameproof mesh sheet was obtained in the same manner as in Example 1 except that 1.0 part by weight of Nova Excel 130 (2.9 parts by weight based on 100 parts by weight of a resin solid content) was used as red phosphorus, 8 parts by weight of TERRAJU-60 (22.9 parts by weight based on 100 parts by weight of the resin solid content) was used as ammonium polyphosphate, and 35 parts by weight of Hijilite H-42M (100 parts by weight based on 100 parts by weight of the resin solid content) was added as aluminum hydroxide.

The measurement results of the properties of the flameproof mesh sheet are shown in Table 1.

EXAMPLE 6

A flameproof mesh sheet was obtained in the same manner as in Example 1 except that 1.0 part by weight of Nova Excel 140 (2.9 parts by weight based on 100 parts by weight of the resin solid content) was used as red phosphorus, 8 parts by weight of TERRAJU-60 (22.9 parts by weight based on 100 parts by weight of the resin solid content) was used as ammonium polyphosphate, and 35 parts by weight of Kisuma 5 (100 parts by weight based on 100 parts by weight of the resin solid content) was used as magnesium hydroxide.

The measurement results of the properties of the flameproof mesh sheet are shown in Table 1.

EXAMPLE 7

A imitation gauze fabric was woven of 45 warps/10 cm and 45 wefts/10 cm with a Dobby weaving machine by paralleling 3 multi-filament fibers of 750 denier to coat the fabric and not the multi-filament fibers in Example 1. The weight of the fabric was 225 g/m$^2$. Thereafter, the fabric was caused to pass through a guide roll, pinched with a pinch roll, pass through a flame retardant in a tank filled with the same retardant as in Example 1 except that 100 parts by weight of water was added, squeezed with a squeezing roll and dried with an air blow to remove the flame retardant filled in the weave of the fabric, and gelled in a heating furnace having a temperature gradient of 130° C., 160° C. and 170° C., and the coated cloth was taken up by a winder.

The coated cloth was caused to pass through a tank filled with the flame retardant and the same procedure was repeated twice to obtain coated cloth having a coating amount of 378 g/m$^2$ (mesh sheet cloth). The cloth was cut to a predetermined size, sewed and subjected to non-shifting processing to obtain a flameproof mesh sheet.

EXAMPLE 8

A imitation gauze fabric was woven of 120 warps/10 cm and 120 wefts/10 cm with a Dobby weaving machine by using 1 multi-filament fiber of 250 denier to coat the fabric and not the multi-filament fiber in Example 1. The weight of the fabric was 66 g/m$^2$.

Thereafter, the fabric was caused to pass through a guide roll, pinched with a pinch roll, pass through a flame retardant in a tank filled with the same retardant as in Example 1 except that 100 parts by weight of water was added, squeezed with a squeezing roll and dried with an air blow to remove the flame retardant filled in the weave of the fabric, and gelled in a heating furnace having a temperature gradient of 130° C., 160° C. and 170° C., and the coated cloth having a weight of 118 g/m$^2$ was taken up by a winder.

The cloth was cut to a predetermined size, sewed and subjected to non-shifting processing to obtain a flameproof mesh sheet.

Comparative Example 1

A flame retardant having a viscosity of 2,030 cps was obtained in the same manner as in Example 1 except that the amount of Nova Excel 130 as red phosphorus was changed to 0.3 part by weight (0.86 part by weight based on 100 parts by weight of the resin solid content). A flameproof mesh sheet was produced in the same manner as in Example 1 except that the above flame retardant was used.

The measurement results of the properties of the flameproof mesh sheet are shown in Table 1.

Comparative Example 2

A flame retardant having a viscosity of 1,450 cps was obtained in the same manner as in Example 1 except that the amount of Nova Excel 140 as red phosphorus was changed to 4.5 parts by weight (12.8 parts by weight based on 100 parts by weight of the resin solid content) and the amount of TERRAJU-60 as ammonium polyphosphate was changed to 3 parts by weight (8.6 parts by weight based on 100 parts by weight of the resin solid content). A flameproof mesh sheet was produced in the same manner as in Example 1 except that the above flame retardant was used.

The measurement results of the properties of the flameproof mesh sheet are shown in Table 1.

Comparative Example 3

A flame retardant having a viscosity of 2,180 cps was obtained in the same manner as in Example 1 except that red phosphorus was not used and 10 parts by weight of antimony trioxide (28.6 parts by weight based on 100 parts by weight of the resin solid content) was used. A flameproof mesh sheet was produced in the same manner as in Example 1 except that the above flame retardant was used.

The measurement results of the properties of the flameproof mesh sheet are shown in Table 1.

Comparative Example 4

A flame retardant having a viscosity of 1,270 cps was obtained in the same manner as in Example 1 except that ammonium polyphosphate was not used, 10 parts by weight of antimony trioxide (28.6 parts by weight based on 100 parts by weight of the resin solid content) was used and water was not added. A flameproof mesh sheet was produced in the same manner as in Example 1 except that the above flame retardant was used.

The measurement results of the properties of the flameproof mesh sheet are shown in Table 1.

Comparative Example 5

A flame retardant having a viscosity of 1,060 cps was obtained in the same manner as in Example 1 except that red phosphorus and ammonium polyphosphate were not used, 10 parts by weight of antimony trioxide (28.6 parts by weight based on 100 parts by weight of the resin solid content) and 12 parts by weight of decabromodiphenyl oxide (34.3 parts by weight based on 100 parts by weight of the resin solid content) were used and water was not added. A flameproof mesh sheet was produced in the same manner as in Example 1 except that the above flame retardant was used.

The measurement results of the properties of the flameproof mesh sheet are shown in Table 1.

Comparative Example 6

Coated yarn of 2,538 denier was obtained by coating a multi-filament fiber using a 0.6 mm-diameter sizing nozzle in place of a 0.7 mm-diameter sizing nozzle in Example 1. A flameproof mesh sheet was produced in the same manner as in Example 1 except that the flame retardant was not coated twice and the coated yarn was used.

The measurement results of the properties of the flameproof mesh sheet are shown in Table 1.

TABLE 1

|  | Example 1 | Example 2 | Example 3 | Example 4 | Example 5 | Example 6 | Example 7 | Example 8 |
|---|---|---|---|---|---|---|---|---|
| ethylene-methacrylic acid metal ion copolymer S-300 | 100 | — | 70 | — | 100 | 100 | 100 | 100 |
| S-650 |  |  |  | 100 |  |  |  |  |
| ethylene-based α-olefin copolymer a-100 |  | 100 | 30 |  |  |  |  |  |
| red phosphorus nova excel 140 | 4.3 | 3.7 | 4.6 | — | 2.9 | 2.9 | 4.3 | 4.3 |
| red phosphorus nova red 120 |  |  |  | 11.1 |  |  |  |  |
| aminonium polyphosphate A | 34.3 | — | 36.8 | 44.4 | 22.9 | 2.9 | 34.3 | 34.3 |
| ammonium polyphosphate B | — | 45 | — |  |  |  |  |  |
| antimony trioxide |  |  |  |  |  |  |  |  |
| decabromodiphenyl oxide |  |  |  |  |  |  |  |  |
| ammonium hydroxide C |  |  |  |  | 100 |  |  |  |
| magnesium hydroxide D |  |  |  |  |  | 100 |  |  |
| isopropyl alcohol | 28.5 | 25 | 31 | 37 | 28.5 | 28.5 | 28.5 | 28.5 |
| Water | 143 | 250 | 154 | 185 | 143 | 143 | 285 | 285 |
| viscosity of aqueous dispersion (CP) | 2140 | 3800 | 3540 | 1840 | 3240 | 3160 | 1120 | 1120 |
| fineness of multi-filament fiber (DE) | 1750 | 2750 | 1750 | 1750 | 1750 | 1750 | — | — |
| fabric number of wefts/10 cm | 52 | 33 | 52 | 52 | 52 | 52 | 45 | 120 |
| number of warps/10 cm | 52 | 33 | 52 | 52 | 52 | 52 | 45 | 120 |
| weight of fabric (g/m²) | — | — | — | — | — | — | 225 | 66 |
| fineness of coated yard (DE) and weight f coated fabric | 4030 | 5225 | 4900 | 3677 | 4422 | 4250 | 378 | 118 |
| flame retardant for olefin mesh sheets/multi-filament fiber and fabric | 130/100 | 90/100 | 180/100 | 110/100 | 153/100 | 143/100 | 68/100 | 79/100 |

TABLE 2

|  | Comparative example 1 | Comparative example 2 | Comparative example 3 | Comparative example 4 | Comparative example 5 | Comparative example 6 |
|---|---|---|---|---|---|---|
| ethylene-methacrylic acid metal ion copolymer S-300 | 100 | — | 70 | — | 100 | 100 |
| S-650 |  |  |  | 100 |  |  |
| ethylene-based α-olefin copolymer a-100 |  |  |  |  |  |  |
| red phosphorus nova excel 140 | 0.86 | 12.8 | — | 4.3 | — | 4.3 |
| red phosphorus nova red 120 |  |  |  |  |  |  |
| ammonium polyphosphate A | 34.3 | 8.6 | 34.3 | — | — | 4.3 |
| ammonium polyphosphate B |  |  |  |  |  |  |
| antimony trioxide |  |  | 28.6 | 28.6 | 28.6 |  |
| decabromodiphenyl oxide |  |  | — | — | 34.3 |  |
| ammonium hydroxide C |  |  |  |  |  |  |
| magnesium hydroxide D |  |  |  |  |  |  |
| isopropyl alcohol | 28.5 | 28.5 | 28.5 | 28.5 | 28.5 | 28.5 |
| Water | 143 | 143 | 143 | 143 | 143 | 143 |
| viscosity of aqueous dispersion (CP) | 2030 | 1450 | 2180 | 1270 | 1060 | 2140 |
| fineness of multi-filament fiber (DE) | 1750 | 1750 | 1750 | 1750 | 1750 | 1750 |
| fabric |  |  |  |  |  |  |
| number of wefts/10 cm | 52 | 52 | 52 | 52 | 52 | 52 |
| number of warps/10 cm | 52 | 52 | 52 | 52 | 52 | 52 |

TABLE 2-continued

|  | Comparative example 1 | Comparative example 2 | Comparative example 3 | Comparative example 4 | Comparative example 5 | Comparative example 6 |
|---|---|---|---|---|---|---|
| weight of fabric (g/m$^2$) | — | — | — | — | — | — |
| fineness of coated yard (DE) and weight f coated fabric | 4010 | 3940 | 4120 | 3830 | 3940 | 2538 |
| flame retardant for olefin mesh sheets/multi-filament fiber and fabric | 129/ 100 | 125/ 100 | 135/ 100 | 119/ 100 | 125/ 100 | 45/ 100 |

TABLE 3

|  | Example 1 | Example 2 | Example 3 | Example 4 | Example 5 | Example 6 | Example 7 | Example 8 |
|---|---|---|---|---|---|---|---|---|
| combustion test |  |  |  |  |  |  |  |  |
| 1) two minutes of 1 minute of combustion |  |  |  |  |  |  |  |  |
| Carbonization area (cm$^2$) | 9 | 11 | 6 | 11 | 10 | 11 | 12 | 8 |
| afterflame time (seconds) | 0 | 0 | 0 | 0 | 0 | 0 | 0 | 0 |
| afterglowtime (seconds) | 0 | 0 | 0 | 0 | 0 | 0 | 0 | 0 |
| 2) 6 seconds or 3 seconds after catching fire |  |  |  |  |  |  |  |  |
| Carbonization area (cm$^2$) | 7 | 9 | 6 | 8 | 8 | 8 | 6 | 7 |
| afterflame time (seconds) | 0 | 1 | 0 | 3 | 2 | 0 | 3 | 3 |
| afterglow time (seconds) | 0 | 1 | 0 | 3 | 2 | 0 | 3 | 3 |
| 3) number of times of flame contact | 4 | 4 | 5 | 4 | 4 | 4 | 4 | 3 |
| amount of halogen gas (HBr) (mg/g) | 0 | 0 | 0 | 0 | 0 | 0 | 0 | 0 |
| tensile strength (warp/weft) (kg/3cm) | 217/215 | 215/217 | 220/218 | 215/217 | 212/213 | 218/222 | 225/223 | 62/61 |
| tensile elongation (warp/weft) (%) | 24/23 | 23/22 | 24/24 | 24/24 | 24/25 | 24/23 | 22/24 | 23/22 |
| toughness (wart/weft) (strength × elongation) | 10416/9890 | 9890/9548 | 10560/10464 | 10320/10416 | 10176/10650 | 10464/10212 | 9900/10704 | 2852/2684 |
| drop impact strength (penetration test) m | 8 | 7 | 8 | 8 | 8 | 8 | 6 | 2 |

TABLE 4

|  | Comparative example 1 | Comparative example 2 | Comparative example 3 | Comparative example 4 | Comparative example 5 | Comparative example 6 |
|---|---|---|---|---|---|---|
| Combustion test |  |  |  |  |  |  |
| 1) two minutes or 1 minute of combustion |  |  |  |  |  |  |
| carbonization area (cm$^2$) | total combustion | total combustion | total combustion | total combustion | 9 | total combustion |
| afterflame time (seconds) | — | — | — | — | 0 | — |
| afterglow time (seconds) | — | — | — | — | 0 | — |
| 2) 6 seconds or 3 seconds after catching fire |  |  |  |  |  |  |
| carbonization area (cm$^2$) | total combustion | total combustion | total combustion | total combustion | 8 | total combustion |
| afterflame time (seconds) | — | — | — | — | 0 | — |
| afterglow time (seconds) | — | — | — | — | 0 | — |
| 3) Number of times of flame contact | — | — | — | — | 4 | — |
| amount of halogen gas (HBr) (mg/g) | 0 | 0 | 0 | 0 | 32 | 0 |
| tensile strength (warp/weft) (kg/3 cm) | 221/220 | 217/215 | 218/215 | 217/218 | 218/217 | 218/216 |
| tensile elongation (warp/weft) (%) | 22/23 | 24/22 | 23/24 | 23/23 | 23/24 | 23/24 |
| toughness (warp/weft) (strength × elongation) | 9724/10120 | 10416/9890 | 10028/10320 | 9982/10028 | 10028/10416 | 10028/10368 |
| drop impact strength (penetration test) m | — | — | — | — | 8 | — |

(1) The amount of each composition in above Tables is the total in parts by weight of an ethylene-methacrylic acid metal ion copolymer having a solid content of 35 wt % or 27 wt % and an aqueous dispersion of an ethylene-based α-olefin copolymer having a solid content of 40 wt %. Other components are expressed in parts by weight when the resin solid content of the dispersion is 100.

(2) The unit of values of the coated fabrics of Examples 7 and 8 is g/m$^2$.

(3) The multi-filament fiber x number of fibers in Examples 7 and 8 are 750×3 and 250×1, respectively.

(4) The combustion tests of Examples 4, 7 and 8 and Comparative Examples 4 and 6 were based on A-1 method in which heating was carried out for 1 minute and flames were produced after 3 seconds.

(5) A is TERRAJU-60 (of Chisso Co.).

(6) B is Hostafuram AP 462 (of Hoechst Japan Limited).

(7) C is Hijilite H-42M (of Showa Denko Co.).

(8) D is Kisuma-5 (of Kyowa Kagaku Co.).

(9) The figures in the column of the fineness (De) of the coated yarn and the coated fabric indicate coated fabric in Examples 7 and 8 and coated yarn in other examples.

The weight of olefin flame retardant/multi-filament fiber and fabric in Table 1 and Table 2 is expressed in $g/m^2$.

measurement methods of properties 1. viscosity measurement method

BM type viscometer rotor No. 6, revolution of 12 rpm, 25° C.

2. combustion test measured in accordance with JIS L-1091

A-1 method (45° C., micro-burner method)

A-2 method (45° C., meckel burner method)

D method (number of times of flame contact)

3. tensile strength test measured in accordance with JIS L-1068

4. amount of HBr gas generated 0.5 g of a sample was taken. This sample was placed in a combustion tube, preheated at 350 to 400° C. for 5 minutes and postheated at 800±30° C. for 30 minutes, and a combustion gas was sampled in a flask filled with a 1/10 N NaOH solution. The quantity of HBr contained in the solution was determined by ion chromatography.

5. drop impact strength (penetration test)

measured in accordance with JIS-8952.

A steel tube having an outer diameter of 48.6 mm, a thickness of 2.5 mm and a weight of 2.7 kg was used in this test in the case of a flameproof mesh sheet for houses having a small number of stories and scattering prevention flameproof mesh sheet.

The flameproof mesh sheet of the present invention is excellent in flame resistance and satisfactory in terms of drop impact strength without generating harmful halogen gas at the time of combustion.

Japanese Patent Application 9-225464 filed Jul. 18, 1997 is incorporated herein by reference in its entirety.

We claim:

1. A process for the preparation of a halogen-free flameproof multi-filament fiber comprising:

a) preparing a flame retardant comprising about 1.5 to 15 parts by weight of red phosphorus and about 10 to 70 parts by weight of an ammonium polyphosphate compound based on 100 parts by weight of a solid content of an aqueous dispersion of a polyolefin resin having a resin solid content of about 20 to 45 wt %, wherein the polyolefin resin of the aqueous dispersion of a polyolefin resin is one or two selected from ethylene-methacrylic acid metal ion crosslinked copolymers and ethylene-based α-olefin copolymers; and b) coating said multi-filament fiber with said flame retardant.

2. The process according to claim 1, wherein said multi-filament has an equivalent single fineness of a multi-filament fiber of about 3 to 17 denir, a total fineness of about 1,000 to 4,500 denir, a tensile strength of about 6 to 10 g/denir and a break strength of about 14 to 45%.

3. The process according to claim 1, wherein said multi-filament is coated by impregnating said multi-filament with the flame retardant.

4. The process according to claim 1, wherein said multi-filament is woven prior to being coated with said flame retardant, and has an equivalent single fineness of a multi-filament fiber of about 2 to 13 denir, a total fineness of about 150 to 2,500 denir, a tensile strength of about 6 to 10 g/denir and a break strength of about 14 to 45%.

5. A process for the preparation of a halogen-free flameproof mesh sheet comprising:

a) preparing a flame retardant comprising about 1.5 to 15 parts by weight of red phosphorus and about 10 to 70 parts by weight of an ammonium polyphosphate compound based on 100 parts by weight of a solid content of an aqueous dispersion of a polyolefin resin having a resin solid content of about 20 to 45wt %, wherein the polyolefin resin of the aqueous dispersion of a polyolefin resin is one or two selected from ethylene-methacrylic acid metal ion crosslinked copolymers and ethylene-based α-olefin copolymers; and b) coating said mesh sheet with said flame retardant.

6. The process according to claim 5, wherein said mesh sheet has an equivalent single fineness of a multi-filament fiber of about 3 to 17 denir, a total fineness of about 1,000 to 4,500 denir, a tensile strength of about 6 to 10 g/denir and a break strength of about 14 to 45%.

7. The process according to claim 5, wherein said mesh sheet comprises a multi-filament fiber coated with the flame retardant.

8. The process according to claim 5, wherein the mesh sheet fabric is woven of a multi-filament and is prepared by paralleling 1 to 4 fibers having an equivalent single fineness of about 2 to 13 denir, a total fineness of about 150 to 2,500 denir, a tensile strength of about 6 to 10 g/denir and a break strength of about 14 to 45% and leno weaving with a weaving machine and has a mesh length of about 10 to 140 warps/10 cm and about 10 to 140 wefts/10 cm.

9. The process according to claim 5, wherein said flame retardant is used in an amount of about 60 to 350 parts by weight based on 100 parts by weight of the multi-filament fiber on the mesh sheet fabric woven of the multi-filament fiber.

10. A process for producing a halogen-free flameproof mesh sheet comprising:

weaving a multi-filament fiber by a Dobby weaving machine to obtain a woven cloth;

immersing said woven cloth in a tank filled with a flame retardant for mesh sheets comprising about 1.5 to 15 parts by weight of red phosphorus and about 10 to 70 parts by weight of an ammonium polyphosphate compound based on 100 parts by weight of a solid content of an aqueous dispersion of a polyolefin resin having a resin solid content of about 20 to 45 wt %, the polyolefin resin being one or two selected from ethylene-methacrylic acid metal ion crosslinked copolymers and ethylene-based α-olefin copolymers; and drying and gelling said woven cloth.

11. A process according to claim 10, wherein the polyolefin resin of the aqueous dispersion of a polyolefin resin is a mixture of about 90 to 10 wt % of the ethylene-methacrylic acid metal ion crosslinked copolymer and about 10 to 90 wt % of the ethylene-based α-olefin copolymer.

12. The process according to claim 10, wherein said mesh sheet has an equivalent single fineness of a multi-filament fiber of about 3 to 17 denir, a total fineness of about 1,000 to 4,500 denir, a tensile strength of about 6 to 10 g/denir and a break strength of about 14 to 45 %.

13. The process according to claim 10, wherein said mesh sheet comprises a multi-filament fiber coated with the flame retardant.

14. The process according to claim 10, wherein the mesh sheet fiber is woven of a multi-filament and is prepared by paralleling 1 to 4 synthetic fibers having an equivalent single fineness of about 2 to 13 denir, a total fineness of about 150 to 2,500 denir, a tensile strength of about 6 to 10 g./denir and a break strength of about 14 to 45% and leno weaving with a weaving machine and has a mesh length of about 10 to 140 warps/10 cm and about 10 to 140 wefts/10 cm.

15. The process according to claim 10, wherein said flame retardant is used in an amount of about 60 to 350 parts by weight based on 100 parts by weight of the multi-filament fiber or the mesh sheet fabric woven of the multi-filament fiber.

16. A process for the preparation of a halogen-free flame-proof multi-filament fiber comprising:
   a) preparing a flame retardant comprising about 1.5 to 15 parts by weight of red phosphorus and about 10 to 70 parts by weight of an ammonium polyphosphate compound based on 100 parts by weight of a solid content of an aqueous dispersion of a polyolefin resin having a resin solid content of about 20 to 45 wt %, wherein the polyolefin resin of the aqueous dispersion of a polyolefin resin is a mixture of about 90 to 10 wt % of an ethylene-methacrylic acid metal ion crosslinked copolymer and about 10 to 90 wt % of an ethylene-based α-olefin copolymer; and
   b) coating said multi-filament fiber with said flame retardant.

17. The process according to claim 16, wherein said multi-filament has an equivalent single fineness of a multi-filament fiber of about 3 to 17 denir, a total fineness of about 1,000 to 4,500 denir, a tensile strength of about 6 to 10 g/denir and a break strength of about 14 to 45 %.

18. The process according to claim 16, wherein said multi-filament is coated by impregnating said multi-filament with the flame retardant.

19. The process according to claim 16, wherein said multi-filament is woven prior to being coated with said flame retardant, and has an equivalent single fineness of a multi-filament fiber of about 2 to 13 denir, a total fineness of about 150 to 2,500 denir, a tensile strength of about 6 to 10 g/denir and a break strength of about 14 to 45 %.

20. A process for the preparation of a halogen-free flame-proof mesh sheet comprising:
   a) preparing a flame retardant comprising about 1.5 to 15 parts by weight of red phosphorus and about 10 to 70 parts by weight of an ammonium polyphosphate compound based on 100 parts by weight of a solid content of an aqueous dispersion of a polyolefin resin having a resin solid content of about 20 to 45 wt %, wherein the polyolefin resin of the aqueous dispersion of a polyolefin resin is a mixture of about 90 to 10 wt % of an ethylene-methacrylic acid metal ion crosslinked copolymer and about 10 to 90 wt % of an ethylene-based α-olefin copolymer; and
   b) coating said mesh sheet with said flame retardant.

21. The process according to claim 20, wherein said mesh sheet has an equivalent single fineness of a multi-filament fiber of about 3 to 17 denir, a total fineness of about 1,000 to 4,500 denir, a tensile strength of about 6 to 10 g/denir and a break strength of about 14 to 45 %.

22. The process according to claim 20, wherein said mesh sheet comprises a multi-filament fiber coated with the flame retardant.

23. The process according to claim 20, wherein the mesh sheet fabric is woven of a multi-filament and is prepared by paralleling 1 to 4 synthetic fibers having an equivalent single fineness of about 2 to 13 denir, a total fineness of about 150 tto 2,500 denir, a tensile strength of about 6 to 10 g./denir and a break strength of about 14 to 45 % and leno weaving with a weaving machine and has a mesh length of about 10 to 140 warps/10 cm and about 10 wefts/10 cm.

24. The process according to claim 20, wherein said flame retardant is used in an amount of about 60 to 350 parts by weight based on 100 parts by weight of the multi-filament fiber or the mesh sheet fabric woven of the multi-filament fiber.

* * * * *